Dec. 2, 1958    R. G. STIRRETT    2,862,408
INDEXING TOOL POST TURRET

Filed June 16, 1955    2 Sheets-Sheet 1

INVENTOR
ROBERT G. STIRRETT
BY
ATTORNEY

Dec. 2, 1958  R. G. STIRRETT  2,862,408
INDEXING TOOL POST TURRET
Filed June 16, 1955  2 Sheets-Sheet 2

INVENTOR,
ROBERT G. STIRRETT
BY
ATTORNEY

United States Patent Office 2,862,408
Patented Dec. 2, 1958

2,862,408

INDEXING TOOL POST TURRET

Robert G. Stirrett, Altadena, Calif.

Application June 16, 1955, Serial No. 515,831

5 Claims. (Cl. 74—826)

This invention relates to a tool holding device, and more particularly to an indexing tool post turret incorporating novel detent, cam and locking means.

Indexing tool post turrets which are rotatable to a number of positions or stations in order to effect operation upon a workpiece by a number of different tools are known in the art, but are either extremely complicated and difficult to operate, or are inaccurate in effecting the desired tool location. It will be understood that tool holders which are complicated and difficult to operate result in substantial added expenses not only because of their initial relatively high purchase price and substantial upkeep and maintainence costs, but also because of labor time lost by the machinist in adjusting the turret between its various stations. It will also be understood that an indexing tool post turret is substantially worthless if it is not operative to move a tool to precisely the same station each time, since variations in the station location during cycles of operation of the tool would result in disuniformity in the various workpieces operated upon by the tool.

In view of the above factors characteristic of tool holding devices, it is an object of the present invention to provide an indexing tool post turret which is simple and economical to manufacture and operate, yet is extremely accurate in locating and locking a tool at the exact same station during each use of the device.

An additional object of the invention is to provide combination detent, screw-locking and cam means for effecting indexing of the turret and locking of the turret in a precise desired station with only a minimum of movement of the handle portion of the device.

These and other objects and advantages of the invention will be more fully set forth in the following specification and claims considered in connection with the attached drawings to which they relate.

Figure 2:
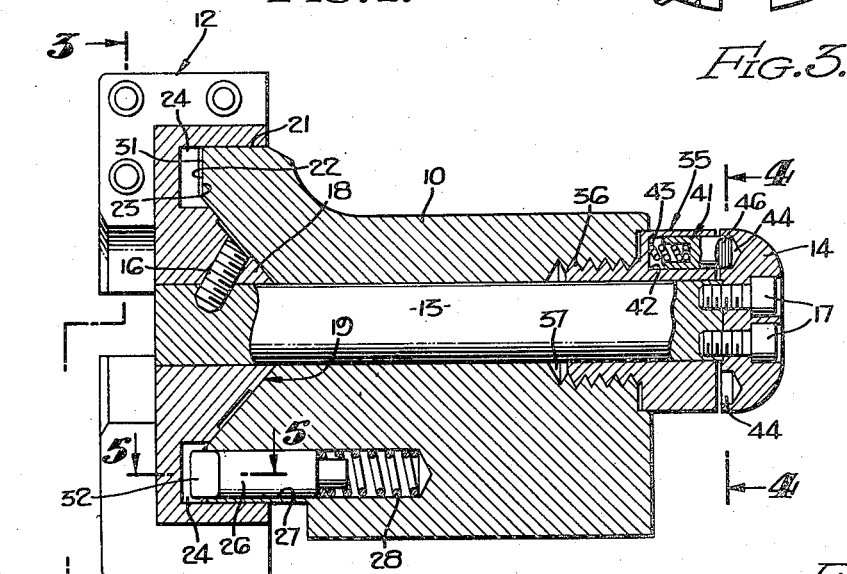
Figure 2 is an enlarged longitudinal sectional view taken along line 2—2 of Figure 1.
Figures 4, 5, 6:
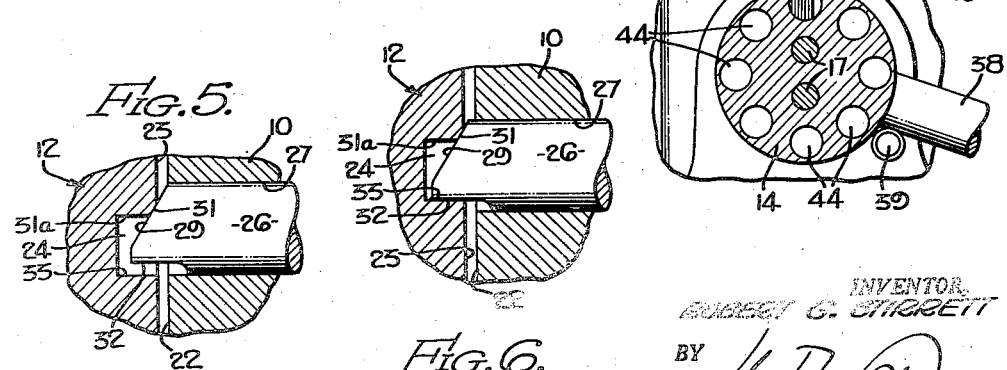
Figure 4 is an enlarged transverse sectional view taken on line 4—4 of Figure 2 and as viewed in the direction of the arrows.
Figure 5 is an enlarged fragmentary longitudinal sectional view on line 5—5 of Figure 2, and illustrating the combination cam and detent means in its position prior to camming of the turret to the precise station desired.
Figure 7:
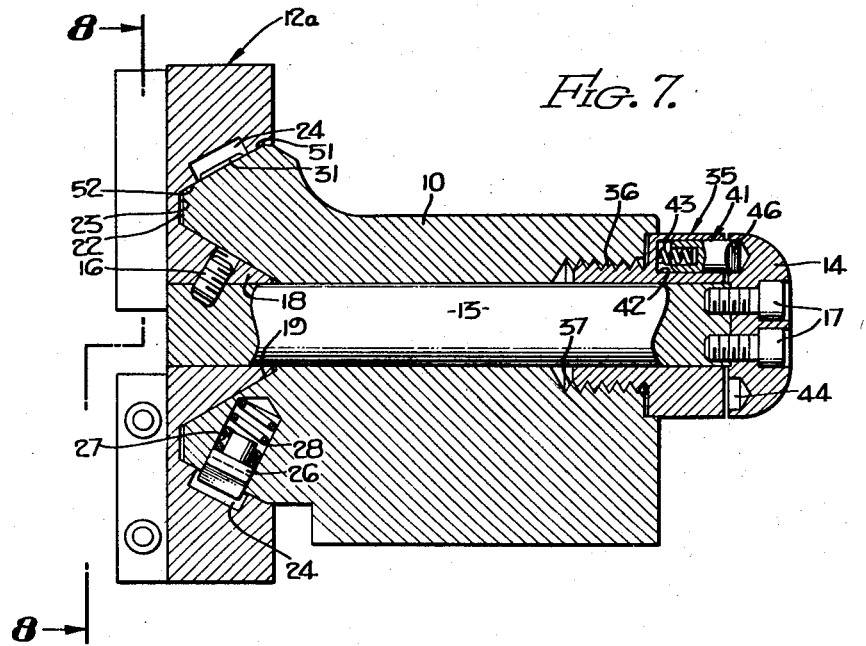
Figure 8:
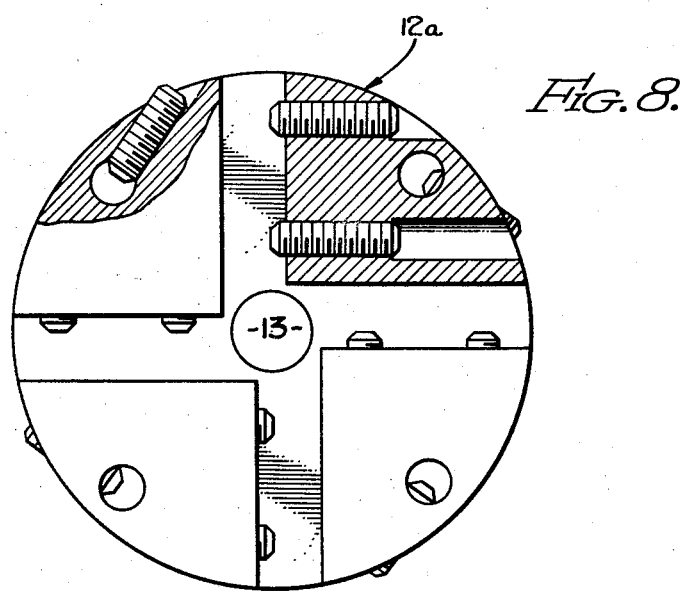

Figure 6 corresponds to Figure 5 but illustrates the position of the cam and detent means after camming of the turret to the desired station;

Figure 7 corresponds generally to Figure 2 but illustrates a modified form of the invention, in which the turret is provided with both inner and outer frustoconical surfaces for increased bearing area and locking action; and Figure 8 is a section on line 8—8 of Figure 7 and showing the turret construction of the modified form.

Figure 1:
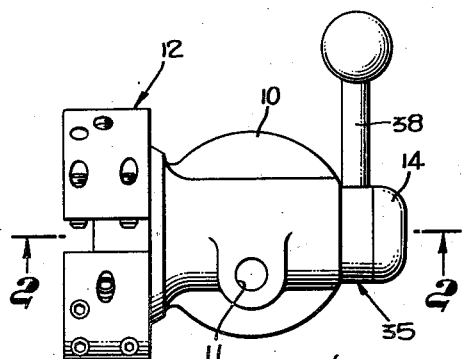
Figure 1 is a plan view of an indexing tool post turret embodying the present invention.

Referring now to the drawings, and particularly to Figures 1 and 2, the indexing tool post turret is seen to comprise a stationary base 10 adapted to be fixedly mounted on a suitable support such as a lathe or other machine with which the turret may be associated, for example by means of a bolt extended through a vertical bore 11 in the base. The structure further comprises a turret assembly which rotates as a unit relative to base 10 and includes a turret head 12, a shaft 13 mounted in base 10 for both rotational and axial movement, and an end cap 14. The turret head 12 is non-rotatably secured to one end of shaft 13 by means of a key screw 16 shown in Figure 2, and the end cap 14 is non-rotatably secured to the other end of shaft 13 by means of a pair of cap screws 17.

Figure 3:
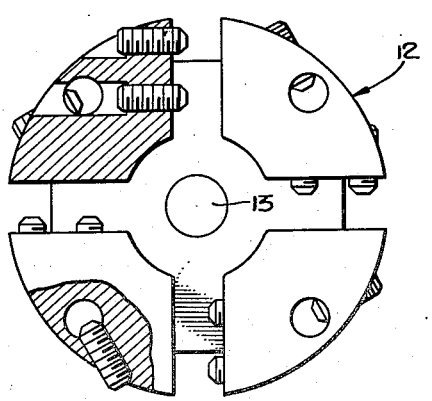
Figure 3 is a transverse section on line 3—3 of Figure 2 and illustrating the turret construction.

The turret head 12 is provided with suitable slots, holes and mounting screws, as shown in Figure 3, for reception of various tools at eight stations which are preferably equally spaced about the circumference of the turret head. It follows that it is desired to rotate the turret assembly, comprising head 12, shaft 13 and cap 14, to eight equally spaced stations or positions in order to present various ones of the tools to the work. It is also desired that the turret assembly be effectively locked selectively in any one of the eight stations, but that the assembly be readily unlocked to permit indexing.

The means for selectively locking the turret assembly against rotation relative to base 10, and unlocking the assembly to permit rotation of turret head 12 to a different station, include a frustoconical protrusion 18 formed on the inner side of turret head 12 for seating against a corresponding frustoconical recess 19 on base 10. The surface of portion 18 is adapted to lock against surface 19 upon shifting of shaft 13 and thus head 12 to the right as viewed in Figure 2, and by means to be described subsequently. Turret head 12 has a running fit with base 10 along cylindrical interfaces 21 disposed radially outwardly of portion 18 and surface 19, there being a radial end wall 22 on base 10 and disposed opposite a corresponding radial wall 23 formed on turret head 12 between frustoconical portion 18 and the cylindrical interfaces 21.

Provided in turret head 12 at eight equally spaced points around radial wall 23 are generally rectangular recesses 24 which form a part of detent or ratchet means associating turret head 12 and base 10. The recesses 24 selectively receive a combination cam and pawl element 26 which is mounted longitudinally of shaft 13 in a bore 27 in base 10. A compression spring 28 in the bottom portion of bore 27 serves to bias the element 26 into the recess 24 with which it is registered, the spring being relatively strong so that it can provide the camming action next to be described in connection with Figures 5 and 6.

The element 26 has a beveled cam face 29 adapted to cooperate with a beveled edge 31 of one wall 31a of each recess 24, and also has a flat face 32 adapted to come into surface engagement with the opposite wall 33 of each recess 24. The depth of each recess 24 is such that cam element 26 can never touch the bottom thereof, so that when the parts are in the position shown in Figure 5 the spring 28 will become operative to push element 26 further into the registered recess 24. This provides a cam action between face 29 and beveled edge 31 which continues until face 32 of the element 26 engages wall 33 of the recess as shown in Figure 6, with resulting rotation of turret head 12. When the face 32 and wall 33 are engaged, it is known that turret head 12 is in the precise position or station desired.

Proceeding with the description of the means for selectively locking and indexing the turret assembly, a locking sleeve 35 is rotatably mounted on the end portion of shaft 13 remote from turret head 12 and is provided with an exteriorly threaded portion 36 mating with an interiorly threaded recess 37 in base 10. A radial handle or crank 38 is mounted on locking sleeve 35 for convenience in the manual rotation thereof through an arc somewhat less than 360°, the rotation being limited by engagement of the handle with a stop pin 39 (Figure 4) mounted in base 10. Detent or ratchet means are provided between locking sleeve 35 and end cap portion 14 of the turret assembly comprising a pin 41 slidably mounted in a longitudinal bore 42 in sleeve 35. A compression spring 43 located between the bottom of bore 42 and pin 41 acts to urge the latter into any one of eight recesses 44 (Figures 2 and 4) equally spaced about the inner surface of end cap 14. The portion of pin 41 entering a recess 44 is provided with a beveled face 46 such that the sleeve 35 may be rotated in one direction independently of end cap 14 within the described 360° arc, but is effective when sleeve 35 is rotated in the opposite direction to rotate cap 14 and shaft 13. It will be understood that the rotation of shaft 13 is effected only after pin 41 has become seated in one of the recesses 44 and while sleeve 35 is being rotated clockwise.

It is important to note that when locking sleeve 35 is turned in a given direction, the outer end thereof abuts the interior radial face of end cap 14 and moves the same to the right as viewed in Figure 2 and operates through shaft 13 to draw frustoconical turret portion 18 against surface 19 thereby frictionally locking turret head 12 against rotation. In the illustrated example, the threads on sleeve portion 36 and in recess 37 are right-hand threads whereby rotation of the sleeve in a counterclockwise direction, as viewed from the right in Figure 2, provides the described locking action. As will be clear from the foregoing and from the drawings, the device may be constructed for the counterclockwise indexing of the turret by employing left-hand threads at 36 and 37 and by rotating detent pins 26 and 41 180° from their present positions. It is also important to note that detent or pawl element 41 is so oriented that when the sleeve 35 is rotated in the described counterclockwise or locking direction the element 41 will be cammed out of any recesses 44 and relative rotation will be permitted. Thus, the beveled face 46 appears on the side towards the viewer in Figure 2 and will provide a cam action with the wall of each recess 44 such that the element 41 will be cammed out of each recess into which it snaps, and relative rotation permitted as sleeve 35 is turned counterclockwise sufficiently to lock head 12 against rotation.

In addition to the above, it is pointed out that the relative location of cam element 26 is such as to lock the turret head 12 against substantial counterclockwise rotation, as viewed from the right in Figure 2, but to permit unlimited rotation thereof in a clockwise direction. The engagement of face 32 of element 26 with surface 33 therefore locks the turret head 12 and thus shaft 13 and cap 14 when sleeve 35 is being turned counterclockwise to provide the screw-locking action described above, and during which the element 41 slips relative to cap 14 and does not lock therewith.

Preferably, each recess 24 lies in the same plane as a corresponding recess 44, said plane containing the axis of shaft 13.

In the operation of the indexing tool post turret, let it be assumed that eight different tools have been mounted one in each of the eight equally spaced mounting portions or elements in turret head 12. Let it be further assumed that the handle 38 has been rotated clockwise, as viewed from the right in Figures 1 and 2, until cam element 26 has snapped into a recess 24 corresponding to the positioning of a desired tool at the working station. The cam 26 is then in the approximate position shown in Figure 5 since there is normally a slight overtravel of the turret head 12 relative to cam element 26. Upon release of handle 38, however, the spring 28 operates as described above to force cam element 26 into recess 24 and provide a cam action between cam face 29 and beveled edge 31 to bring faces 32 and 33 in contact as shown in Figure 6. The spring 28 thus operates to effect rotation of turret head 12 in a counterclockwise direction until it is in the precise position desired for the selected tool station, the direction being the reverse of that in which handle 38 was moved during the indexing operation.

The desired station having been reached, the operator then rotates handle 38 counterclockwise, as viewed from the right in Figures 1 and 2, causing pawl or detent element 41 to snap into and out of several recesses 44 until the relative threading action between portion 36 and the wall of recess 37 has effected shifting of sleeve 35 to the right sufficiently to closely engage end cap 14. This results in shifting of shaft 13 and turret head 12 to the right, and thus in locking of frustoconical turret portion 18 against surface 19, the outer cammed end of detent 41 then being positioned between a pair of recesses 44.

This shifting of the turret 12 to the right also effects an additional camming action between surfaces 29 and 31 (Figures 5 and 6) to insure that the surfaces 33 and 32 remain in close engagement so that the tool remains at the exact desired station. Also, it is pointed out that during the counterclockwise rotation of sleeve 35 to effect locking, the tendency of shaft 13 and turret head 12 to rotate due to frictional drag is also counterclockwise, which is a further factor tending to cause the surfaces 32 and 33 (Figures 5 and 6) to be engaged as desired. In any event, the turret 12 will not rotate away from the desired station during the counterclockwise rotation of handle 38 to effect locking, since the abutted surfaces 32 and 33 prevent such action.

When the operator desires to present a different tool to the workpiece, he merely rotates handle 38 in a clockwise direction as viewed from the right in Figures 1 and 2. The initial rotation of handle 38 causes relative threading between sleeve portion 36 and the wall of recess 37 to release the locking action, so that frustoconical portion 18 no longer lockingly engages surface 19. After such a release of locking has occurred, pawl or detent element 41 snaps into the next adjacent recess 44 in end cap 14, and continued clockwise rotation of handle 38 operates through element 41 to effect corresponding clockwise rotation of the turret assembly comprising end cap 14, shaft 13 and turret head 12. Such clockwise rotation will continue until the desired tool is at the work station, and is not impeded by the cam element 26 since a releasing ratchet action is then provided between beveled edge 31 and cam face 29 of cam element 26 so that cam element 26 effects no locking action at this time.

In the event that the stop pin 39 prevents sufficient clockwise rotation of handle 38 to cause the desired tool to be at the work station, the operator merely pumps the handle 38 back and forth, but insufficiently far to effect a locking action by threaded sleeve portion 36 as described above, until the desired tool is at the work station. The operator of the device is readily able to tell when the tool is at the approximate work station since he can feel and hear a click of cam element 26 snaps into the recess 24 corresponding to the work station.

Referring next to the embodiment of the invention shown in Figures 7 and 8, all of the construction is the same, and has been given the same reference numerals as the construction shown in Figures 1-6, with the following exceptions. In the first place, the turret head 12a shown in Figure 8 is of a somewhat different construction than that shown in Figure 3. In the second place, and more importantly, the cylindrical interfaces 21 of the first embodiment are omitted, and the base 10 is formed with an exterior frustoconical surface 51 which cooperates with an interior frustoconical surface 52 formed on the turret head 12a. Locking is thus effected both between frustoconical portion 18 and surface 19 as in the first embodiment, and between surfaces 51 and 52, so that additional bearing area is provided and the locking is more secure.

In addition to the above, it is pointed out that the recesses 24 for cam element 26 are not provided in radial wall 23 but are instead provided in the frustoconical wall 52. Accordingly, and in order that the cam element 26 will extend perpendicularly to the wall in which the recesses 24 are formed, the bore 27 for the cam element 26 extends in a generally radial direction instead of a longitudinal one.

In connection with both forms of the invention, it is pointed out that although the apparatus has been described as having eight working stations, and thus eight recesses 24, 44, etc., there may be any number of working stations as required by design considerations.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A manually indexed tool turret comprising a supporting base having a turret rotatably supported thereon, a spring-pressed detent having a cammed end portion disposed opposite a flat surface substantially parallel to its axis, said detent being reciprocably supported between said turret and said base, a plurality of locking recesses having a detent-engaging wall substantially parallel to the axis thereof for selectively seating the cammed portion of said detent with the flat surface of the detent juxtaposed to said recess wall, manually operable means for indexing said turret from station to station and for automatically retracting said detent as the turret begins to advance toward a new station thereby storing additional energy in said spring, said stored energy being automatically effective in cooperation with the cammed portion of the said detent to position said head precisely in a new operating station with said flat surface pressed firmly against said recess side wall, and said manually operable indexing means including means for locking the turret in its new precisely-located operating station.

2. A manually indexed tool turret comprising a shaft having a turret secured to one end and an indexing member secured to its other end, a supporting base located between said turret and member and including a manually operable locking sleeve having a radial face cooperable with the juxtaposed face of said indexing member to lock said turret rigidly against rotation, a pair of spring-pressed detents having cammed ends adapted to seat selectively in recesses concentric with said shaft and located in the adjacent radial faces of said turret and of said indexing member respectively, one of said spring-pressed detents being operable to position said turret precisely at a new operating station following the movement of the turret to a position in proximity to said new station, and manual means for thereafter rotating said locking sleeve to a position clamping the turret in its precisely located new station and for simultaneously moving the other of said detents to a position out of registry with any one of its associated seating recesses.

3. A manually indexed tool turret as defined in claim 2 wherein said manually operable means for clamping said turret in a selected operating station is operable upon reverse movement to unclamp said turret head for free rotary movement to another operating station, said last-mentioned detent being positioned to seat in one of said associated recesses after said manual means has been rotated through a short arc sufficient to unclamp the turret and being then effective upon further movement of said manual means to index said turret into proximity to a selected operating station.

4. A manually indexed tool turret as defined in claim 1 characterized in that the flat surface of said detent is offset inwardly from the adjacent side wall of the detent thereby permitting the turret to be initially indexed approximately to its new position slightly out of position in either direction from its desired precise operating position and wherein the cammed portion of said spring-pressed detent is effective in cooperation with the edge of said locking recess to shift the turret in either direction as required to center the same precisely and accurately in the desired new setting.

5. A manually indexed tool turret comprising a rigid support having a bore therethrough in which is rotatably journaled a shaft fixed to a turret head, a unitary indexing handle threadedly supported in the end of said bore remote from said head and coaxially of said bore, cooperating spring-pressed detent and recess means between said indexing handle and the adjacent end of said shaft operable to index said turret in one direction as said handle is rotated in that same direction and operable when rotated in the opposite direction to clamp radial surfaces of said turret immovably against the juxtaposed surface of said rigid support, and spring-pressed detent and recess means extending across said radial surfaces, said last-mentioned detent having a cammed end surface opposite a flat surface parallel to its axis and cooperable with a similarly disposed straight wall of said recess to provide precision positioning means for the turret while it is being clamped by the operation of said indexing handle.

References Cited in the file of this patent

UNITED STATES PATENTS

| | | |
|---|---|---|
| 431,855 | Simpson | July 8, 1890 |
| 462,160 | Pihl | Oct. 27, 1891 |
| 639,892 | Fay | Dec. 26, 1899 |
| 993,290 | Bullard | May 23, 1911 |
| 2,433,026 | Casella | Dec. 23, 1947 |
| 2,531,198 | Bruet et al. | Nov. 21, 1950 |